H. J. ACHTER.
SELF INDEXING LEDGER.
APPLICATION FILED OCT. 23, 1908.
949,514.
Patented Feb. 15, 1910.
5 SHEETS—SHEET 1.
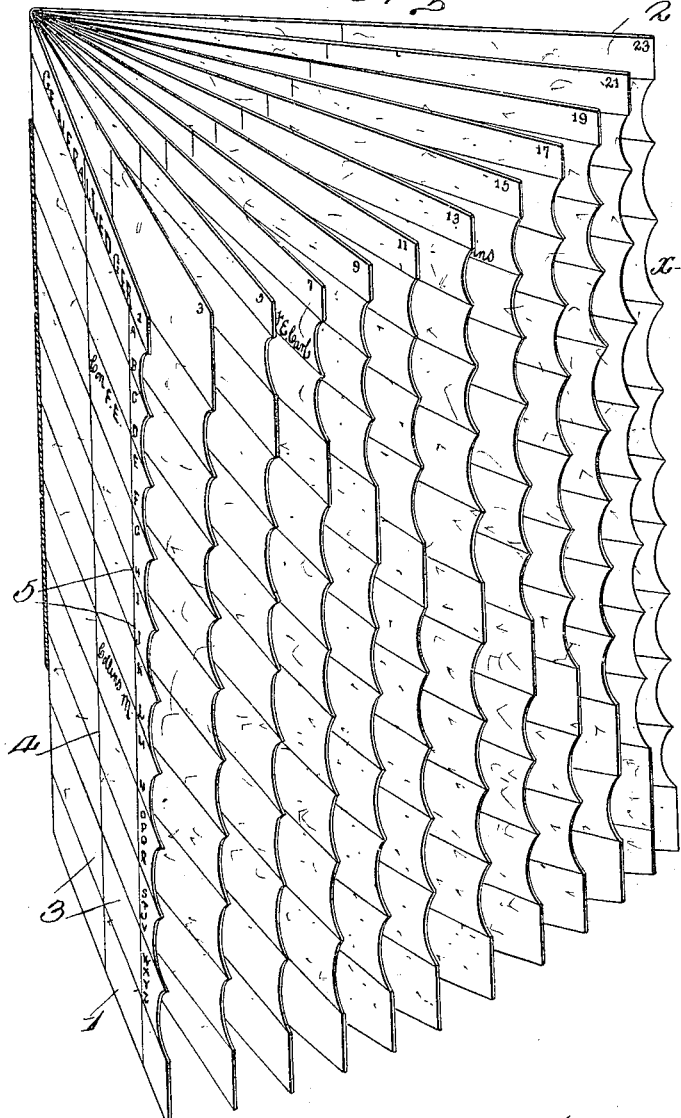
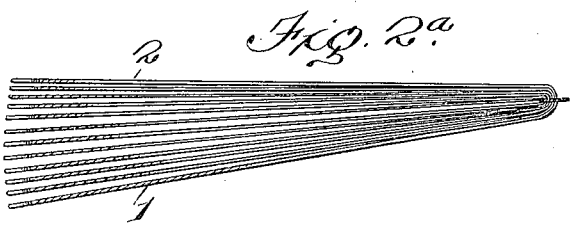

H. J. ACHTER.
SELF INDEXING LEDGER.
APPLICATION FILED OCT. 23, 1908.
949,514.
Patented Feb. 15, 1910.
5 SHEETS—SHEET 2.
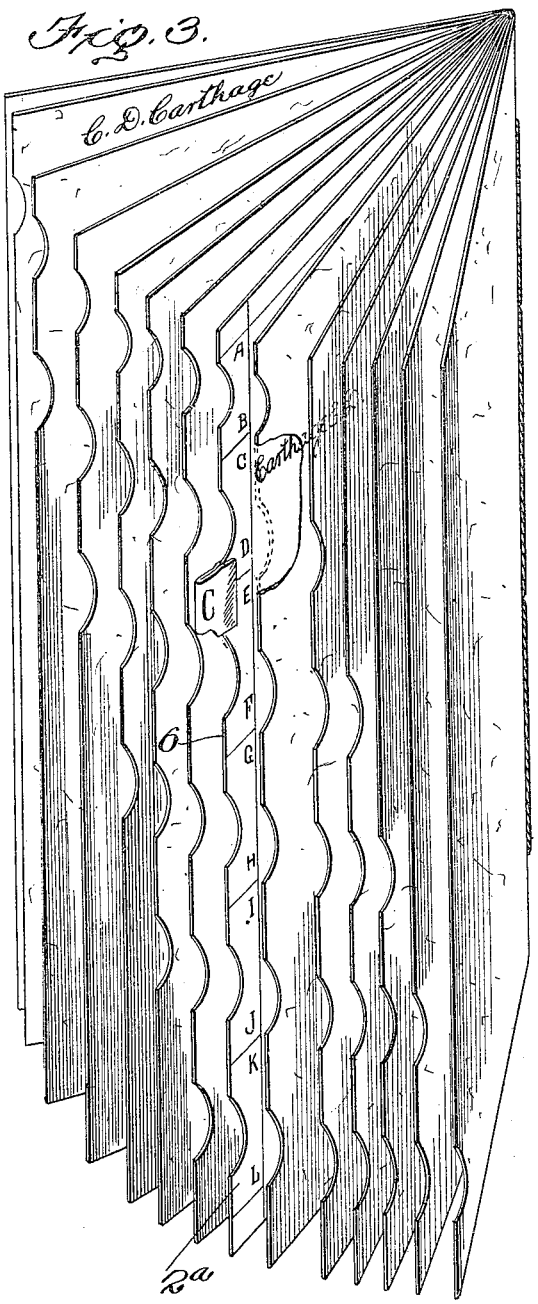
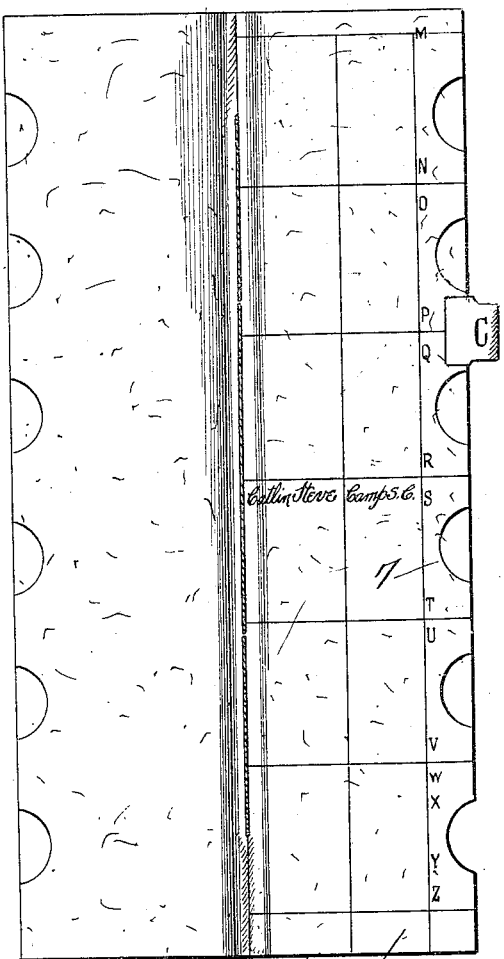

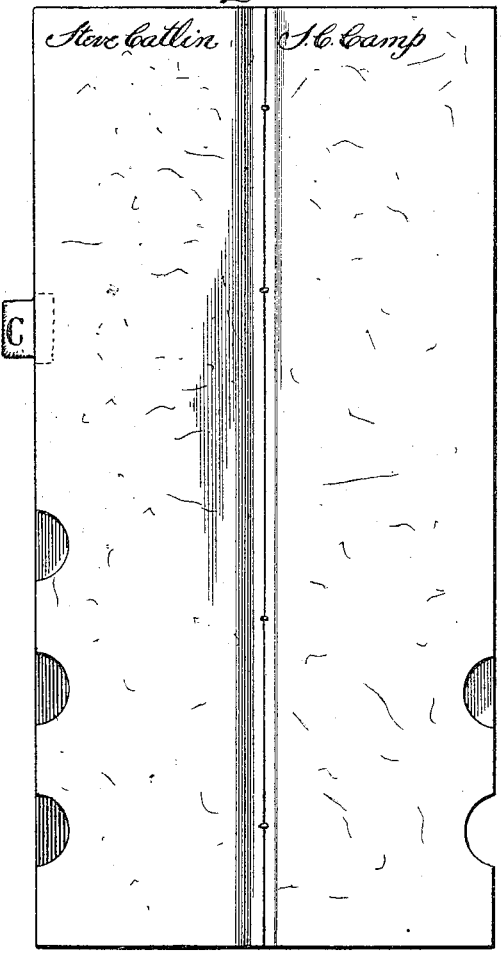

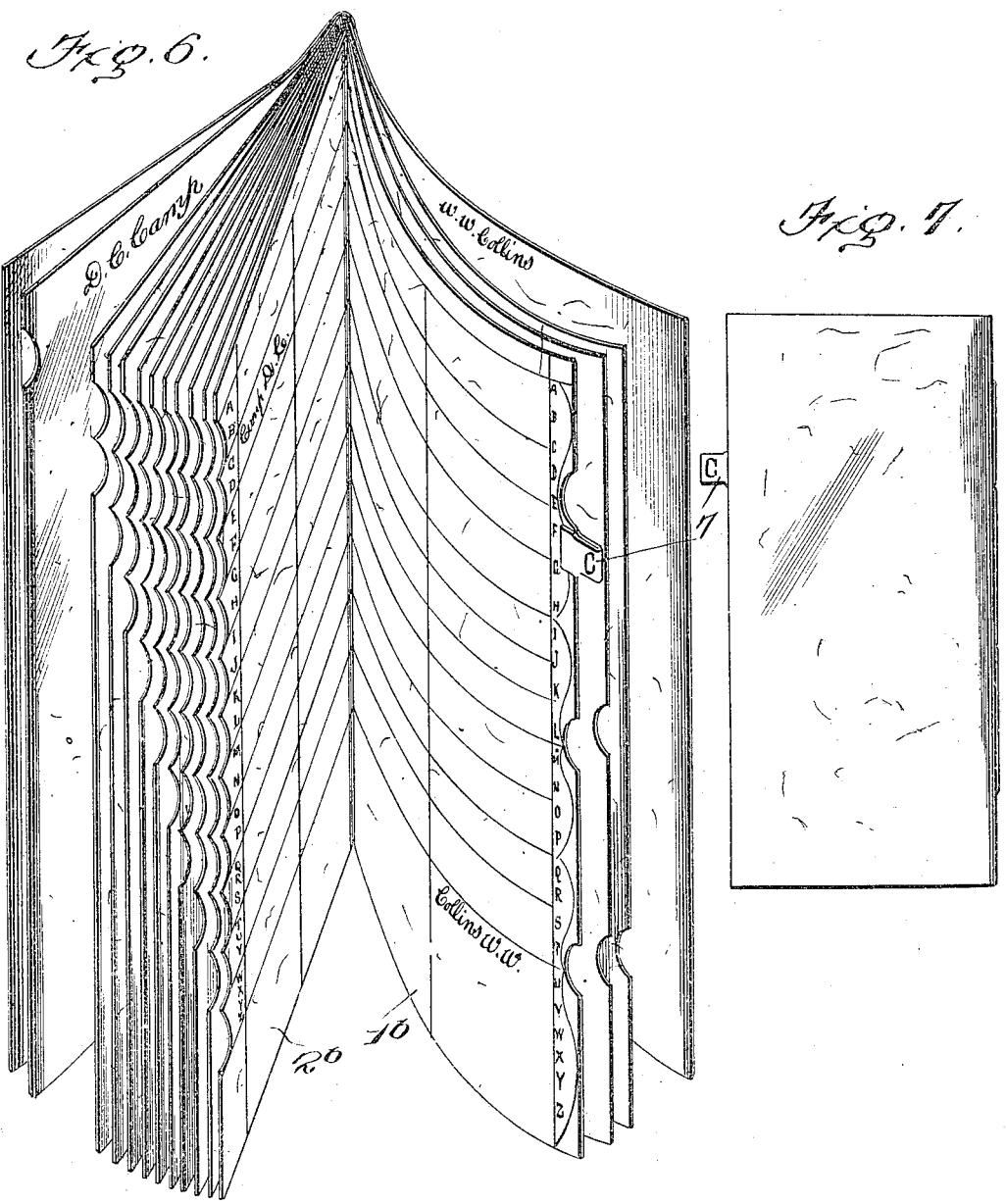

H. J. ACHTER.
SELF INDEXING LEDGER.
APPLICATION FILED OCT. 23, 1908.
949,514.
Patented Feb. 15, 1910.
5 SHEETS—SHEET 5.
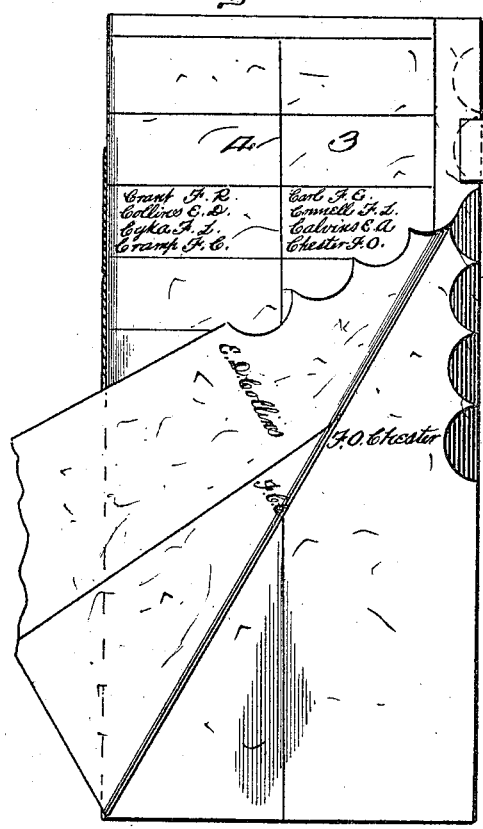
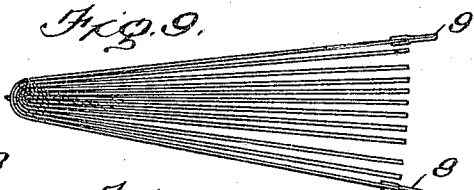
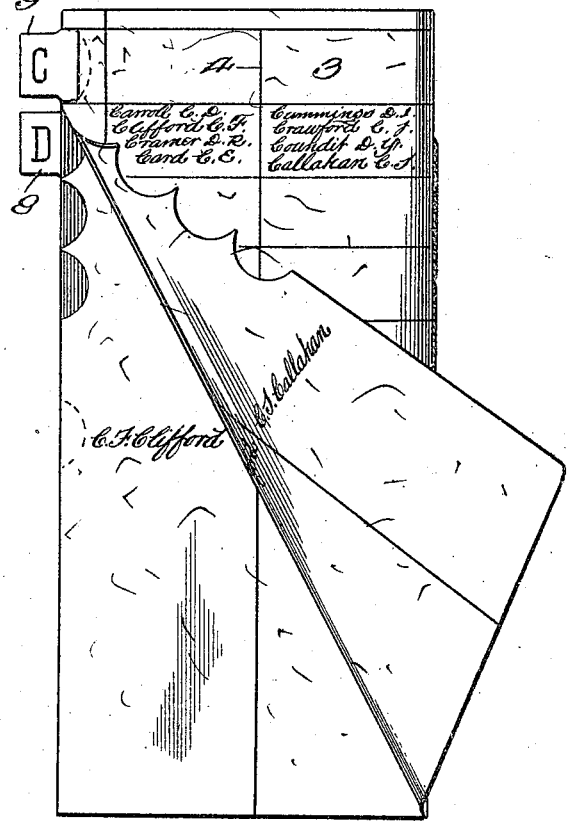
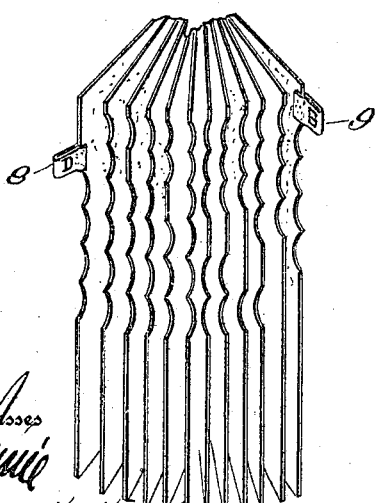
Inventor
H. J. Achter
Witnesses
By ........., Attorneys

UNITED STATES PATENT OFFICE.

HENRY J. ACHTER, OF CEDAR RAPIDS, IOWA.

SELF-INDEXING LEDGER.

949,514.  Specification of Letters Patent.  Patented Feb. 15, 1910.

Application filed October 23, 1908.   Serial No. 459,241.

*To all whom it may concern:*

Be it known that I, HENRY J. ACHTER, a citizen of the United States, residing at Cedar Rapids, in the county of Linn and State of Iowa, have invented certain new and useful Improvements in Self-Indexing Ledgers, of which the following is a specification.

This invention relates to the art of indexing, and comprehends certain new and useful improvements in that type of book or ledger that is known in the trade, as "self indexing".

The primary object of the invention is an improved book or ledger, or sets of loose leaves, so arranged and indexed as to greatly facilitate the work of the book-keeper, or accountant, enabling him to turn quickly and with a minimum of thought or attention to any account in the ledger or name in the book. And a further object of the invention is a device of this character which will economize space as hereinafter explained.

With these and other objects in view, as will more fully appear as the description proceeds, the invention consists in certain constructions, arrangements and combinations of the parts that I shall hereinafter fully describe and claim.

For a full understanding of the invention, reference is to be had to the following description and accompanying drawings in which:

Figure 1 is a perspective view of a group of leaves embodying one form of my invention; Fig. 2 is a face view or elevation of the group of leaves shown spread out in Fig. 1; Fig. 2ª is a horizontal sectional view on the line x—x of Fig. 2; Fig. 3 is a perspective view illustrating a modified arrangement of index leaf; Fig. 4 is a view illustrating the modified arrangement with the book section or group of leaves thrown open to expose one face or page of the index leaf. Fig. 5 shows the section illustrated in Figs. 3 and 4 as turned over to expose the names or accounts that are found by going through the nick of the index page which displays such names as in Fig. 4; Fig. 6 illustrates in perspective another modification of the invention hereinafter specifically described; Fig. 7 shows the outermost face of the last leaf of that modified form which is illustrated in Fig. 6. Fig. 8 is designed to illustrate the dividing pages between the several sections and is a face view of one group of leaves, several leaves being turned up at the lower right hand corner to illustrate certain pages in the body portion of the section or group; Fig. 9 is a top plan view of a group of pages illustrated in Fig. 8; Fig. 10 is a view similar to Fig. 8, but looking at the opposite side of the group. Fig. 11 is a perspective view of such group partly spread out. Fig. 12 is a detail face view of an index leaf provided with an improved name finder as will be hereinafter fully set forth; and Fig. 13 is a similar view illustrating another arrangement of name finder.

Corresponding and like parts are referred to in the following description and indicated in all the views of the accompanying drawings by the same reference characters.

My improved book or ledger is divided into sections or groups of pages, the sections being alphabetically denoted as by outstanding tabs. These sections or groups of pages are prepared according to the initial letter of the surname of the parties whose accounts or names are contained within the book. In the present instance, for the purpose of illustration, I have selected the section " C " of the book in which are found all the names of the individuals (or firms) whose surnames begin with the letter " C ". Each section is provided with index tabs. In that form of the invention illustrated in Fig. 1, the index pages designated 1 and 2 respectively, are at the beginning and end of the section or group of pages of which they form a part. The plurality of leaves or sheets contained between the pages 1 and 2 contain all the accounts in the book of individuals whose surnames begin with " C ". Each index page is divided into a series of indexing compartments, designated 3, and such indexing compartments may be again divided as by the vertical lines to produce sub compartments or panels. These latter are designed to receive the names of the parties whose accounts or names appear in the body portion of the section and the index pages have their indexing compartments 3 designated at one end by letters of the alphabet as indicated at 5, such letters referring or corresponding to the initial letter of the first given name of the parties whose names are indexed in such indexing compartment. For instance, as illustrated in Fig. 1, the name "F. E. Con", appears in index page 1 at the compartment marked "F", and the name "M. Collins" appears on the said index page in the compartment marked "M". "C. D. Carroll" appears in the indexing compartment of index page 2 which displays at one end the letter "C", and it is obvious that the compartments may be so arranged that but one letter will be supplied to each compartment. The index pages and their leaves or sheets in the group are so nicked as clearly illustrated in Fig. 1, that by going through the nick opposite one end of an indexing compartment of an index page and the registering nicks of the group of pages underneath said index page, the book-keeper or accountant can at once reach the page upon which appears the name or account of the party indexed in such indexing compartment. For example, it will be seen by Figs. 1 and 2 that by going through the nicks at the name "F. E. Con", the book-keeper will, at once, come to the page upon which the account of "F. E. Con" may be found. By going through the index page 2 where the name "C. D. Carroll" appears, the book-keeper will, at once, find his thumb at the page on which the account of "C. D. Carroll" is written.

One of the most important features of my improved invention resides in the inverse manner of nicking the edges of the leaves. As clearly illustrated in Fig. 1, it will be seen that in the embodiment of the invention there illustrated, the nicks are shown commencing at the top of the front index page 1, and pierce a larger number of leaves as they proceed down the page. On the free edge of the rear index page 2 and the other pages of the section preceding it, the nicks pierce the greatest number of leaves at the top of the book and pierce a gradually decreasing number as they progress downwardly toward the bottom of the page.

By my improved arrangement of nicks, I am enabled to index twice the number of accounts to the same number of leaves and can also furnish twice the amount of space to this increased number of names. To take the heretofore adopted method of nicking as an example; if ten nicks can be cut in the margin of an index leaf eight inches long by cutting the first nick through the first leaf, and the second nick through the first and second leaves, until the ten nicks are cut and all of the leaves are nicked, one is able to reach through any one certain nick, any one certain opening, each opening representing two full pages. One can enter as many accounts on these two pages as he can index names on his index page in the panel or indexing compartment opposite the nick leading to this opening. Assume for instance, that eight names can be entered in each panel. Then, obviously, eight is the maximum number of accounts that can be carried in any opening of the book, or on any two pages. In contra-distinction to this old style, it is to be particularly noted that with my inverse nicking of the leaves as just before described, and the placing of index pages at the beginning and end of each section, I am enabled to reach through any two certain nicks, any one certain opening of two pages as clearly illustrated in Fig. 1. I can index opposite each nick on each of the index pages, say eight names, thereby making sixteen accounts that can be carried on any opening of the book, or on any two pages. Double the amount of space for this increased number of accounts is obtained by cutting the first nick through the first leaf or index page 1, as illustrated in Fig. 1; for the second nick cut through two pages, for the third nick cut through three, and so on until all the nicks are cut. The same method of nicking just described is employed for the opposite side of the book, and the result is twice the number of openings and twice the space for accounts.

It is to be understood that my invention is not limited to that form illustrated in Figs. 1 and 2. If desired, the index pages may form the opposite faces of the same leaf placed at about the middle or at some other position in the body of the book section or group of leaves. Such an arrangement is illustrated in Figs. 3 and 4 in which the index leaf is designated 6, the pages 1$^a$ and 2$^a$ of said index leaf being divided into panels or indexing compartments like pages 1 and 2 before described, except that the panels of one page, as 1$^a$, may display the letters of the alphabet from M to Z, while the other page 2$^a$ may display the remaining letters of the alphabet, that is from A to L. The names indexed on the page 1$^a$ of the index leaf 6 refer to the names of the parties whose accounts are written on the pages to the right of said index page, while those names that are indexed on the other face 2$^a$ of the index page 6 refer to the accounts that are written in the book section on those pages that are to the left of said index page. This arrangement is clearly illustrated in Figs. 3, 4 and 5. Fig. 3 particularly shows that in the nicking of the leaves in this embodiment of the invention, the nicks are deepest at the top, and those to the left of the index leaf become more shallow as they progress downward, while in those leaves to the right of the index leaf, the nicks are deepest at the bottom and become more shallow as they progress upwardly toward the indexed leaves. Hence, if the book-keeper or accountant places his thumb in the nick 7 of the leaf 6 opposite the names S. C. Camp and Steve Catlin, he may, at once, turn to the pages in the book wherein appear the accounts of Camp and Catlin, without any trouble, or turning over of leaves except bodily to the termination of the nick. It is the same when going in the opposite direction, as illustrated in Fig. 3, it being clear if the book-keeper places his thumb in the nick opposite the name C. D. Carthage he may at once turn to the page in the book containing the name of Carthage. The advantages of an index leaf printed on both sides like the index leaf 6 are thus obvious, particularly when considered in comparison with the old style of index leaf printed on one side only and placed at the beginning of a section, it being well known to those versed in the art to which this arrangement appertains that such old arrangement requires two leaves and two C tabs to index a like number of names, whereas with my invention, only one leaf and one C tab are necessary, as clearly illustrated in Figs. 3, 4 and 5.

For still another embodiment of the invention, reference is to be had to Figs. 6 and 7. Fig. 6 illustrates that if desired, the index pages there designated 1$^b$ and 2$^b$ may be mounted in the body portion or section or group of leaves of which they form a part and on opposite faces of the two adjoining leaves. Fig. 7 is a rear view of the section illustrated in Fig. 6. These two views together indicate that the C index tab designated 7 displays the letter C on both sides.

Figs. 8, 9, 10 and 11 illustrate one arrangement of the adjoining sections which is also comprehended in my invention as clearly indicated in these views; it will be seen that the section C is comprehended between the leaf with the index tab 8 attached to it and the leaf with the index tab 9 attached to it. It will also be understood that the section B of the book follows the leaf with the tab 9, and that the section D of the book precedes the leaf with the tab 8 secured to it. The tab 8 contains on one side, the letter D and on the other side, the letter C, while the tab 9 contains on one side the letter B and on the other side the letter C. These views also show some of the leaves turned up at the corner, to illustrate the above described arrangement of nicks whereby the book-keeper can at once turn to the desired account by "going through" or inserting his thumb in the nick on the index page opposite the name and referring to the account for which he is looking.

The modified indexing just described, necessitates that in this modification, the ledger will be arranged backward so that the names beginning with A will begin near the back of the book, and those beginning with Y near the front; this is for the reason that the book-keeper has his pen in his right hand, and manipulates the book with his left hand entirely. With the alphabet running from the back to the front, when the letter "H" is wanted, the thumb of the left hand is placed on the "H" tab, and with the left hand in its natural position, the thumb and hand partly cover the tabs I and J. The next movement is to throw to the right, that portion of the book which conceals the "H" index page. That portion of the book with the index running from the back to the front is from A to G inclusive, and is above and entirely out of the way of the thumb and hand. With the index running from front to back, the portion covering the "H" index page would be I to Z inclusive and would come in contact with the hand, unless the hand be placed in an unnatural position. It is to be understood that my invention is not limited to this reverse indexing, as I do not claim to be the originator thereof.

While the term "book" is used in the appended claims, it is to be understood that this term embodies any collection of leaves whether loose or permanently bound together.

In addition to the advantages above named, it is also obvious that my invention possesses another advantage in that the saving of index tabs accomplished by my invention is of great importance in narrow leaves in loose form. A loose leaf ledger has from thirty to one hundred tabs, and this number can be cut in two, by using an index page printed on both sides and the inverse nicking herein described.

Having thus described the invention, what is claimed as new is:

1. A book embodying a plurality of leaves and index pages, the said leaves being nicked, the nicks piercing a gradually increasing number of leaves and progressing up the book on the left of an index page and down the book on the right of an index page.

2. A book embodying a plurality of leaves and index pages, the said leaves being nicked, the nicks piercing a gradually increasing number of leaves and progressing in one direction on the left of an index page and in the opposite direction on the right of an index page.

3. A self indexing ledger constructed in sections, each of which contains names commencing with the same letter, and an index leaf between every two adjacent sections, each index leaf being provided with a tab, each tab provided on each face with an indexing letter, the letter upon each of the two opposing faces of the two adjacent index tabs being identical with the letters which form the initials of the surnames in the adjacent sections respectively, while the other two letters of said adjacent index tabs are both identical with the letters which form the initials of the surname in the section composed by the leaves contained between such index tabs.

In testimony whereof I affix my signature in presence of two witnesses.

HENRY J. ACHTER. [L. S.]

Witnesses:
PETER CULLEN,
CLARA OWENS.